(12) United States Patent
Ibarra et al.

(10) Patent No.: US 8,622,665 B2
(45) Date of Patent: Jan. 7, 2014

(54) FAST CHIP REMOVAL HOLE SAW

(75) Inventors: Javier Ibarra, Schaumburg, IL (US);
Patrick McAuliffe, Chicago, IL (US);
Wade Nachtigall, Chicago, IL (US);
Christoph Flury, Solothurn (CH); Jon Howell, Agoura Hills, CA (US)

(73) Assignee: Robert Bosch GmbH, Stuttgart (DE)

( * ) Notice: Subject to any disclaimer, the term of this patent is extended or adjusted under 35 U.S.C. 154(b) by 401 days.

(21) Appl. No.: 13/024,884

(22) Filed: Feb. 10, 2011

(65) Prior Publication Data

US 2011/0217133 A1 Sep. 8, 2011

Related U.S. Application Data (60) Provisional application No. 61/304,167, filed on Feb. 12, 2010.

(51) Int. Cl.
*B23B 51/05* (2006.01)

(52) U.S. Cl.
USPC ............................................. 408/206

(58) Field of Classification Search
USPC .......................................... 408/204, 206, 207
IPC ............................................... B23B 51/04, 51/05
See application file for complete search history.

(56) References Cited

U.S. PATENT DOCUMENTS

| | | | | |
|---|---|---|---|---|
| 3,648,508 | A | * | 3/1972 | Hougen ........................... 72/325 |
| 4,779,689 | A | * | 10/1988 | Paxton, III ..................... 175/403 |
| 5,597,274 | A | | 1/1997 | Behner |
| 5,803,677 | A | | 9/1998 | Brutscher et al. |
| 5,803,678 | A | | 9/1998 | Korb et al. |
| 6,588,992 | B2 | | 7/2003 | Rudolph |
| 6,786,684 | B1 | | 9/2004 | Ecker |
| 7,189,036 | B1 | | 3/2007 | Watson |
| 7,637,703 | B2 | | 12/2009 | Khangar et al. |
| 2006/0130629 | A1 | | 6/2006 | Rompel |

(Continued)

FOREIGN PATENT DOCUMENTS

| | | | | |
|---|---|---|---|---|
| GB | 2388804 | A | * 11/2003 | ............. B23B 51/05 |
| JP | 63039708 | A | * 2/1988 | ............. B23B 51/04 |

(Continued)

OTHER PUBLICATIONS

Image showing carbon hole saw, publicly available at least as early as Feb. 9, 2011.
Image showing bimetal hole saw, publicly available at least as early as Feb. 9, 2011.
Image showing carbide hole saw, publicly available at least as early as Feb. 9, 2011.

*Primary Examiner* — Daniel Howell
*Assistant Examiner* — Michael Vitale
(74) *Attorney, Agent, or Firm* — Maginot, Moore & Beck (57) ABSTRACT

A rotary tool accessory in one embodiment includes a base, a circular wall extending upwardly from the base about a central axis, the circular wall including an inner face, an outer face and a circular rim, a first cutting group including a first inwardly extending tooth extending from a location directly above the circular wall to a location closer to the central axis than the inner face, a first outwardly extending tooth extending from a location directly above the circular wall to a location farther from the central axis than the outer face, and a first gullet extending downwardly from the rim toward the base, a second cutting group including a second inwardly extending tooth, a second outwardly extending tooth, and a second gullet, and a toothless expanse of the rim extending between the first cutting group and the second cutting group.

20 Claims, 5 Drawing Sheets

(56) References Cited

U.S. PATENT DOCUMENTS

2007/0212179 A1* 9/2007 Khangar et al. ............. 408/204
2008/0279646 A1 11/2008 Miyanaga
2009/0044674 A1* 2/2009 Neitzell ......................... 83/492

FOREIGN PATENT DOCUMENTS

| JP | 03142199 A | * | 6/1991 | ................ B26F 1/16 |
| JP | 09066411 A | * | 3/1997 | ............. B23B 51/04 |
| JP | 2007290112 A | * | 11/2007 | ............. B23B 51/05 |

* cited by examiner

FAST CHIP REMOVAL HOLE SAW

This application claims the benefit of U.S. Provisional Application Ser. No. 61/304,167, filed Feb. 12, 2010, the disclosure of which is incorporated herein by reference in its entirety.

FIELD OF THE INVENTION

This invention relates to the field of rotary tool bits and more particularly to hole saws used with rotary power tools.

BACKGROUND

Hand-held rotary tools are widely used by many people, including drywallers, professional remodelers, tile installers, homeowners, and artists. These rotary tools typically include an outer housing designed to be easily held within a human hand. The housing retains an electric motor which is operable to drive a rotatable collet or chuck of the rotary tool. An accessory may be releasably coupled with the collet thereby enabling the rotary tool to rotatably drive the accessory.

The widespread use of hand-held rotary tools is a result, in part, of the wide variety of accessories that may be used with the tools. The accessories include various cutting bits, cut-off wheels, polishing wheels, grinding wheels, and sanding discs. Another accessory is a device used to form larger holes in a material. This accessory is referred to as a "hole saw."

Some conventional hole saws share design features that prohibit such saws from being capable of removing chips from the cutting site in an efficient manner. The major design features that cause this inefficiency appear to include the number of teeth, the side clearance, and the absence of a chip conveyance device. When the teeth in these devices become filled with debris, the cutting process slows dramatically due to energy wasted to compact or churn the wood chips.

For example, some prior art hole saws have either a four or six teeth per inch (tpi) configuration which causes small gullets, or the open area adjacent to the cutting edge of the teeth, to have quite a small cross-sectional area. These small "primary" gullets can be easily clogged by chips during the cutting process which prevents each tooth from cutting effectively.

The lack of an efficient means for removing debris is compounded by the practice in many known hole saws of using an alternating set pattern on the teeth. An "alternating set" is a pattern wherein one tooth is configured to cut along an arc with a diameter larger than the diameter of the body of the saw while an adjacent tooth cuts along an arc with a diameter smaller than the diameter of the body of the saw. The alternating set thus provides the necessary clearance for the outside diameter ("OD") and inside diameter ("ID") of the saw body. The generation of a cut line that is wider than the nominal width of the saw is acceptable when the tooth exits the cutting media, as in the case of circular saws, since the excess material is easily removed from the area whereat material is being removed by the saw. In the case of a hole saw, however, the excess material simply adds to the problem of clogging.

One hole saw which overcomes some of the problems identified above is disclosed in U.S. Pat. No. 5,803,677 of Brutscher, et al. which issued on Sep. 8, 1998. The device disclosed in U.S. Pat. No. 5,803,677 includes a cup with two cutting teeth positioned on the open end of the cup. The two cutting teeth are substantially diametrically opposed to one another to provide a balanced cutting engagement of the media and are spaced apart by a chord length of between about 45 to about 180 degrees. A pair of secondary gullets are positioned in the cup proximate to a forward cutting edge of the two cutting teeth. The secondary gullets have a predetermined depth and shape along a longitudinal axis of the cup to suitably remove debris from the cup during a portion of the duration of the hole cut. A plurality of raker teeth may be positioned on the chords defining the spacing between the cutting teeth. The raker teeth are disposed below the cutting teeth, approximately 0.030 inches to engage and move cutting debris formed by the cutting teeth. Accordingly, the device disclosed in U.S. Pat. No. 5,803,677 provides for improved removal of debris.

What is needed is a configuration for a hole saw that provides increased speed.

SUMMARY

In accordance with one embodiment of the present invention, there is provided a rotary tool accessory including a base, a circular wall extending upwardly from the base about a central axis, the circular wall including an inner face, an outer face and a circular rim extending between the inner face and the outer face, a first cutting group including a first inwardly extending tooth extending from a location directly above the circular wall to a location closer to the central axis than the inner face, a first outwardly extending tooth extending from a location directly above the circular wall to a location farther from the central axis than the outer face, and a first gullet extending downwardly from the rim toward the base, a second cutting group including a second inwardly extending tooth extending from a location directly above the circular wall to a location closer to the central axis than the inner face, a second outwardly extending tooth extending from a location directly above the circular wall to a location farther from the central axis than the outer face, and a second gullet extending downwardly from the rim toward the base, and a toothless expanse of the rim extending between the first cutting group and the second cutting group.

In accordance with another embodiment of the present invention, there is provided a rotary tool accessory including a base, a circular wall extending upwardly from the base about a central axis, the circular wall including a circular rim extending between an inner face and an outer face, and a first grouped cutting set and a second grouped cutting set, each of the first grouped cutting set and the second grouped cutting set including an inwardly extending tooth, an outwardly extending tooth, and an associated gullet, and a first toothless expanse of the rim extending between the first cutting group and the second cutting group.

DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 1:
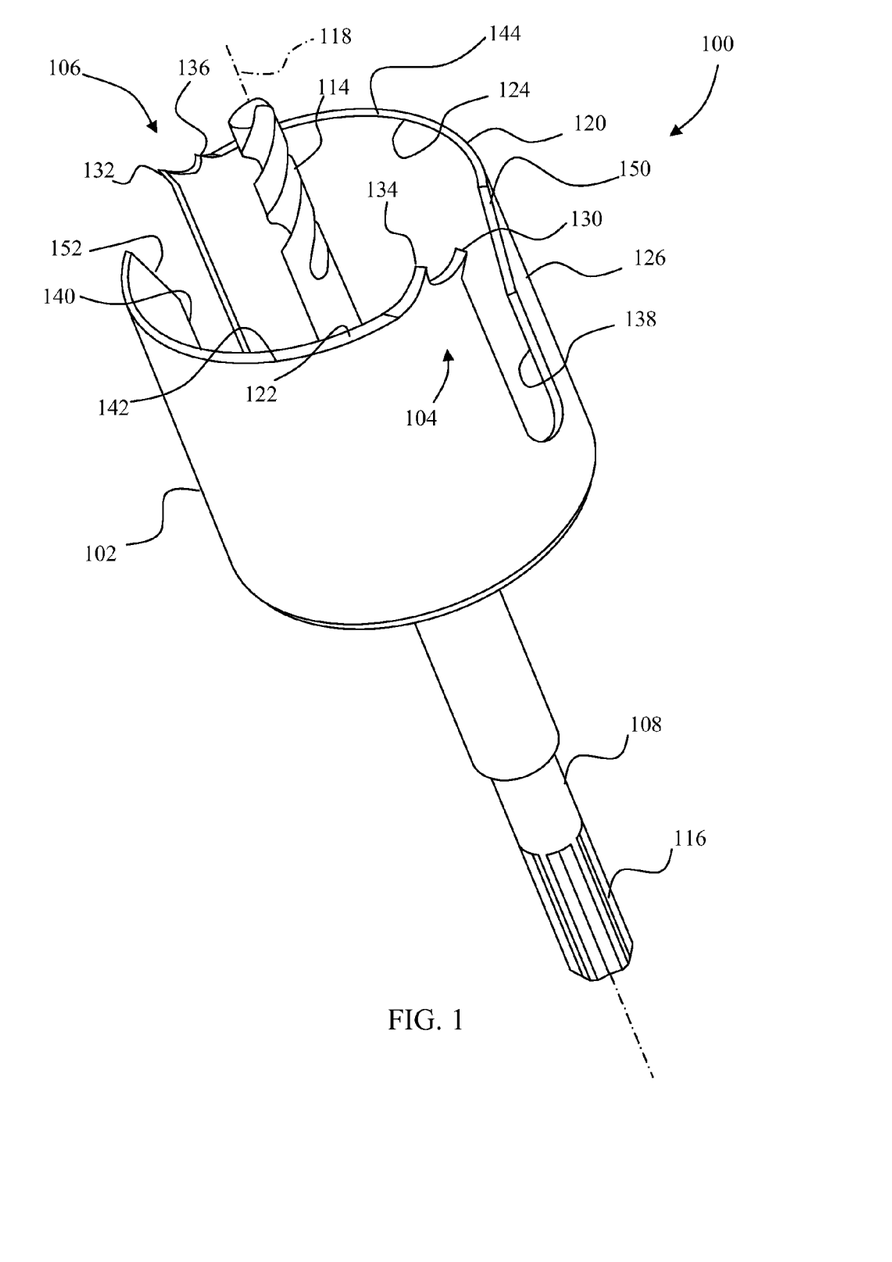
FIG. 1 depicts a perspective view of a rotary tool accessory including two grouped cutting sets in accordance with principles of the present invention.
Figure 2:
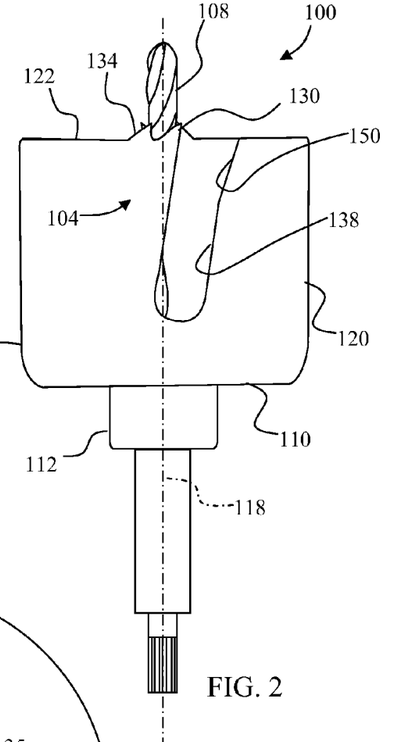
FIG. 2 depicts a side plan view of the rotary tool accessory of FIG. 1.
Figure 3:
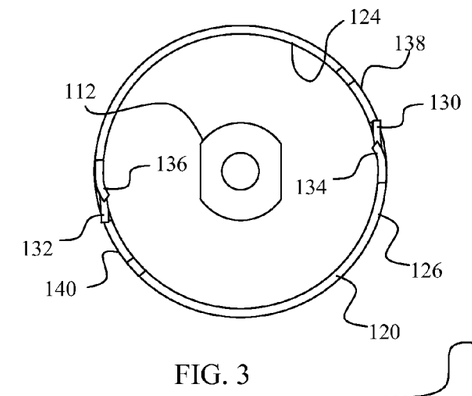
FIG. 3 depicts a top plan view of the rotary tool accessory of FIG. 1.

FIGS. 1-3 depict a rotary tool accessory 100 which includes a cup 102 with two grouped cutting sets 104 and 106 spaced substantially diametrically opposed from each other about the cup 102. In this manner, the rotational thrusts of the cutting sets 104 and 106 are balanced upon engagement and cutting of a media.

A center drill 108 may be secured to the base 110 of the cup 102 by an arbor assembly 112. The center drill 108, which may be permanently or removably coupled to the cup 102, includes a fluted end 114 and a coupling end 116. The coupling end 116 is configured for retention in a chuck or collet of a rotary tool while the fluted end 114 is used to provide precise positioning of the accessory 100 with respect to a work piece. The drill 108 defines an axis of rotation 118 for the accessory 100.

The cup 102 includes a circular wall 120 which extends upwardly from the base 110 to a rim 122 which extends between an inner face 124 and an outer face 126. Each of the grouped cutting sets 104 and 106 include an outwardly extending tooth 130/132, an inwardly extending tooth 134/136, and a gullet 138/140. The grouped cutting sets 104 and 106 are separated from each other by a toothless expanse 142 and a toothless expanse 144 of the rim 122.

Figure 4:
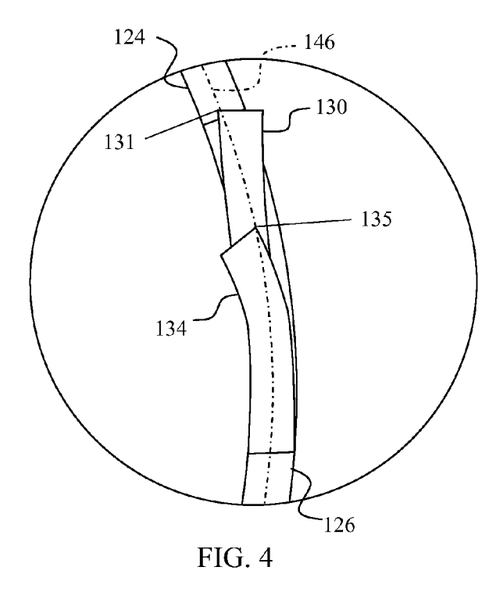
FIG. 4 depicts a partial top plan view of the rotary tool accessory of FIG. 1 showing an outwardly extending tooth positioned immediately adjacent to a gullet with an inwardly extending tooth positioned immediately adjacent to the outwardly extending tooth.

The outwardly extending teeth 130 and 132 extend from a location above the rim 122 to a location farther from the axis of rotation 118 than the outer face 126 as shown best in FIG. 4. The inwardly extending teeth 134 and 136 extend from a location above the rim 122 to a location closer to the axis of rotation 118 than the inner face 124. The outwardly extending teeth 130 and 132 and the inwardly extending teeth 134 and 136 in this embodiment are configured to overlap a centerline 146 of the rim 122 (see FIG. 4). As can be seen in FIG. 4, the inwardly extending teeth and outwardly extending teeth overlap the centerline at a leading tip of each of the inwardly and outwardly extending teeth. For instance, a leading tip 131 of the outwardly extending tooth 130 which is defined by an intersection of sides of the tooth 130, is aligned with the centerline 146. A leading tip 135 of the inwardly extending tooth 134, which is defined by an intersection of the sides of tooth 134, is also aligned with the centerline 146.

The gullets 138 and 140 form openings completely through the wall 120 and extend downwardly from the rim 122 toward the base 110. The gullets 138 and 140 open to the rim 122 through ramped portions 150 and 152, respectively, which are wider than the lower portions of the gullets 138 and 140.

Figure 5:
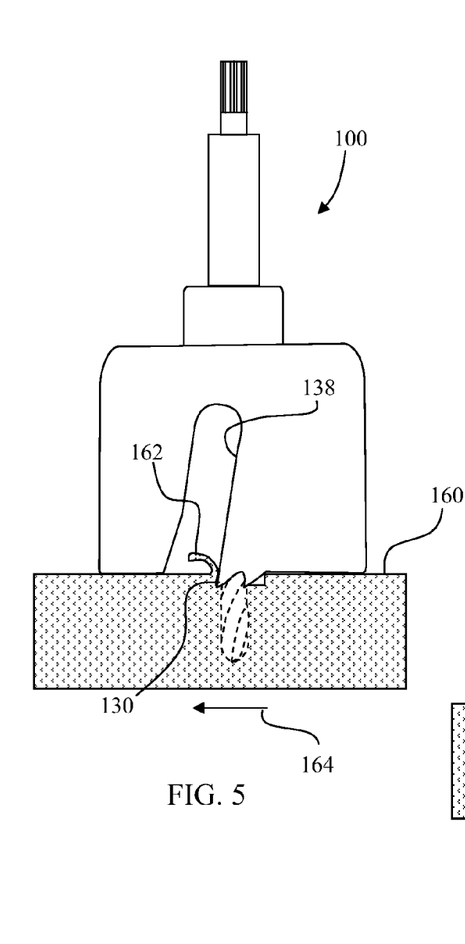
FIG. 5 depicts a cross-sectional view of a work piece with the rotary tool accessory of FIG. 1 cutting into the work piece such that debris formed by the outwardly extending tooth is pushed into the associated gullet.

Each of the teeth in the grouped cutting sets 104 and 106 are associated with the gullet of the respective grouped cutting set 104 and 106. As used herein, a tooth is associated with the gullet through which a majority of the debris formed by the tooth is expelled as the accessory 100 progresses into a work piece. By way of example, FIG. 5 depicts the accessory 100 as a cut is being made in a work piece 160. As the outwardly extending tooth 130 encounters the work piece 160, a curl 162 of debris is formed. The curl 162 is pushed by the extending tooth 130 in the direction of rotation which is indicated by the arrow 164. The curl 162 is thus forced in the direction of the gullet 138.

Figures 6, 7:
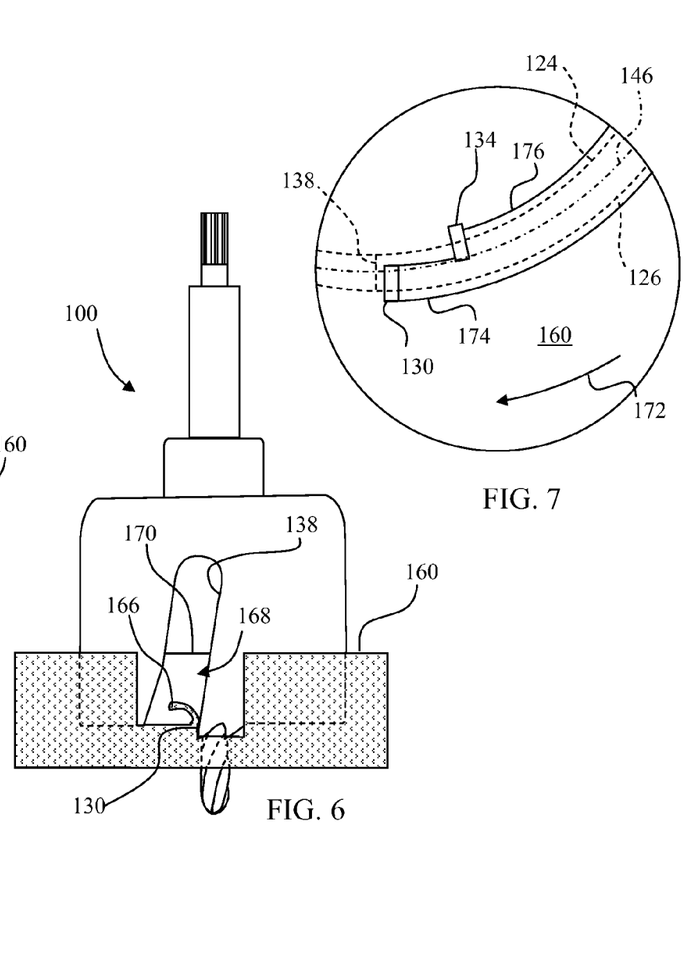
FIG. 6 depicts a cross-sectional view of the work piece of FIG. 5 after the rotary tool accessory of FIG. 1 has cut into the work piece such that debris formed by the outwardly extending tooth is pushed into a channel formed by the associated gullet, the work piece, and a core portion of the work piece that will be removed from the work piece by the rotary tool accessory.
FIG. 7 depicts a top plan view of the work piece of FIG. 5 as the rotary tool accessory of FIG. 1 rotates into the work piece.

Accordingly, as the accessory 100 progresses deeper into the work piece 160 as depicted in FIG. 6, the debris 166 generated by the outwardly extending tooth 130 is propelled into the channel 168 formed by the work piece 160, the core 170 being formed by the accessory 100, and the gullet 138. The debris 166 is thus forced upwardly by newly formed debris until the debris 166 can exit the gullet 138 above the work piece 160.

Similarly, debris formed by the inwardly extending tooth 134 is directed into the gullet 138. As illustrated in FIG. 7, as the outwardly extending tooth 130 rotates through the work piece 160 in the direction of the arrow 172, a channel 174 is formed. The channel 174 extends from a location about directly beneath the centerline 146 of the rim 122 (as depicted in FIG. 7) to a location slightly outwardly of the outer face 126 with a width defined by the width of the outwardly extending tooth 130. As the inwardly extending tooth 134 rotates in the direction of the arrow 172, a channel 176 is formed. The channel 176 extends from a location about directly beneath the centerline 146 of the rim 122 (as depicted in FIG. 7) to a location slightly inwardly of the inner face 124.

The debris formed by the outwardly extending tooth 130, as described above, is transported into the gullet 138. Accordingly, the channel 174 is substantially free of debris when it is initially formed. As the inwardly extending tooth 134 generates debris, the debris is pushed in the direction of the gullet 138. So long as the inwardly extending tooth 134 is close to the gullet 138, the debris is pushed forward with sufficient force to become entrained in the flow of debris formed by the outwardly extending tooth 130 up the gullet 138. Thus, the channel 174 and the channel 176 are substantially free of debris, reducing the potential for binding of the accessory 100.

The configuration of the grouped cutting sets 104 and 106, with the inwardly extending teeth 134/136 immediately behind the outwardly extending teeth 130/132, which are in turn immediately behind the gullets 138/140, respectively, thus reduces the potential for binding of the accessory 100. If desired, the order of the components of the grouped cutting sets 104 and 106 can be modified. By way of example, the inwardly extending teeth 134/136 may be positioned immediately behind the gullets 138/140, respectively.

Figure 8:
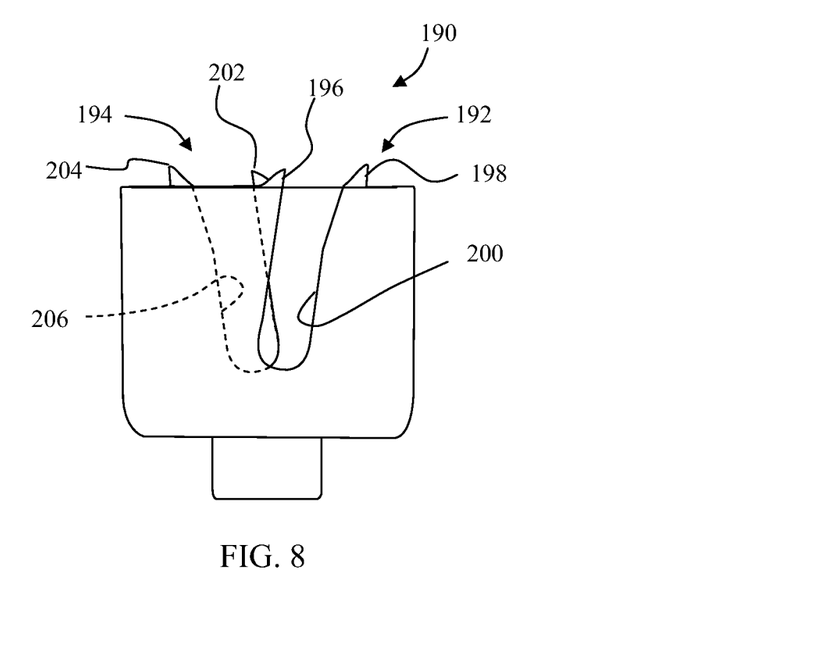
FIG. 8 depicts a side plan view of a rotary tool accessory including two grouped cutting sets in accordance with principles of the present invention wherein for each of the grouped cutting sets one tooth is located ahead of the associated gullet (with reference to the direction of rotation) and a second tooth of the grouped cutting set is located behind the associated gullet.

FIG. 8 depicts an embodiment of an accessory 190 including grouped cutting sets 192 and 194 wherein the order of the components are modified from the order of the components in the grouped cutting sets 104 and 106. The grouped cutting set 192 includes an outwardly extending tooth 196, an inwardly extending tooth 198 and a gullet 200. The grouped cutting set 194 includes an outwardly extending tooth 202, an inwardly extending tooth 204 and a gullet 206.

The inwardly extending tooth 198 in the grouped cutting set 192 is located ahead of the gullet 200 (with reference to the direction of rotation). The inwardly extending tooth 198 is still associated with the gullet 200, however, since the gullet 206 of the grouped cutting set 194 is not proximate the extending tooth 198. Specifically, while debris generated by the extending tooth 198 is pushed initially in the direction of the gullet 206, the debris becomes entrapped in the channel formed by the outwardly extending tooth 202 prior to reaching the gullet 206. The debris is subsequently expelled through the gullet 200 along with the debris generated by the outwardly extending tooth 196. The flow of debris generated by the inwardly extending tooth 198 into the gullet 200 can be assisted by positioning the gullet 200 immediately behind the inwardly extending tooth 198.

Figure 9:
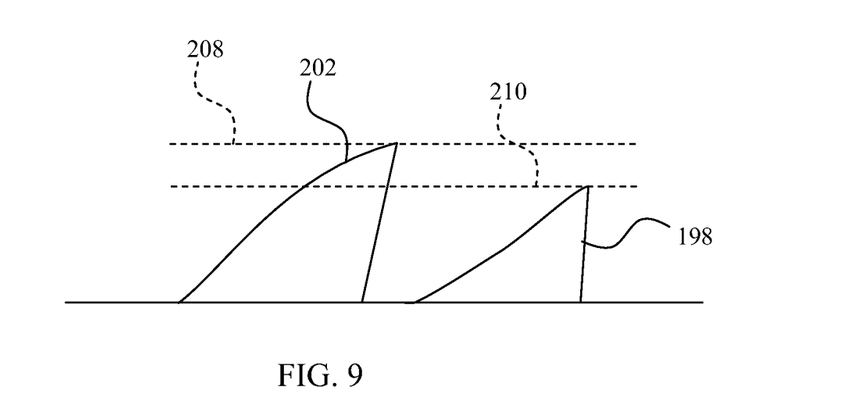
FIG. 9 depicts the relative heights of a preceding tooth and a following tooth for the grouped cutting sets of FIG. 8.

In configurations with a leading tooth such as the inwardly extending tooth 198, the potential for binding may be reduced by providing a difference in height between the inwardly extending tooth 198 and the outwardly extending tooth 202. By way of example, FIG. 9 depicts the inwardly extending tooth 198 and the outwardly extending tooth 202 positioned side by side for purpose of comparing the relative height of the inwardly extending tooth 198 and the outwardly extending tooth 202.

The outwardly extending tooth 202, which precedes the inwardly extending tooth 198 as the accessory 190 rotates, extends to a height above the rim of the accessory 190 indicated by the line 208 while the inwardly extending tooth 198 extends to a height indicated by the line 210. The inwardly extending tooth 198 thus moderates the speed at which the accessory bores into a work piece.

Additionally, the increased height of the outwardly extending tooth 202 creates a deeper channel adjacent to the channel being formed by the inwardly extending tooth 198. The deeper channel thus provides an increased volume for accumulating debris formed by the inwardly extending tooth 198. The increased volume reduces the potential for binding of the accessory 190 by debris formed by the inwardly extending tooth 198 but not yet drawn into the gullet 200.

Figures 10, 11:
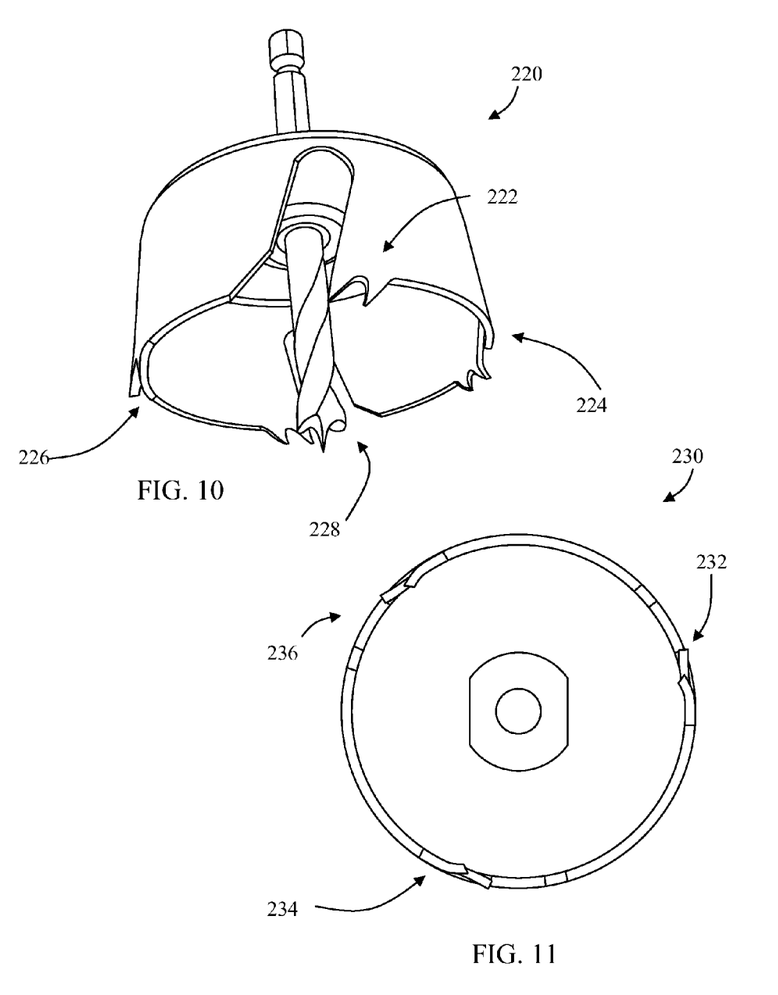
FIG. 10 depicts a perspective view of a rotary tool accessory including four grouped cutting sets in accordance with principles of the present invention wherein the four grouped cutting sets are equally spaced about the rim of the rotary tool accessory and separated from the adjacent grouped cutting sets by an expanse of the rim that is not toothed.
FIG. 11 depicts a top plan view of a rotary tool accessory including three grouped cutting sets in accordance with principles of the present invention wherein the three grouped cutting sets are equally spaced about the rim of the rotary tool accessory and separated from the adjacent grouped cutting sets by an expanse of the rim that is not toothed.

In addition to modification of the order of the components in grouped cutting sets, the number of grouped cutting sets may be modified. The accessory 220 of FIG. 10, for example, includes four groups of cutting sets 222, 224, 226, and 228. As the number of cutting sets is increased, the location of the cutting sets about the perimeter of the accessory is preferably balanced such that each cutting set is separated from each adjacent cutting set by an equal spacing. Thus, the cutting sets 222, 224, 226, and 228 are separated by about 90 degrees. Balanced spacing can also be accomplished with odd numbers of cutting sets. The accessory 230 of FIG. 11, for example, includes three groups of cutting sets 232, 234, and 236 which are evenly spaced at about 120 degrees apart.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A rotary tool accessory comprising:
a base;
a circular wall extending upwardly from the base about a central axis, the circular wall including an inner face, an outer face and a circular rim extending between the inner face and the outer face, wherein the rim includes a centerline defining a circumference of the circular wall;
a first cutting group including
a first inwardly extending tooth extending from a location directly above the circular wall to a location closer to the central axis than the inner face, the first inwardly extending tooth overlapping the centerline,
a first outwardly extending tooth extending from a location directly above the circular wall to a location farther from the central axis than the outer face, the first outwardly extending tooth overlapping the centerline, and
a first gullet extending downwardly along the circular wall from the rim toward the base and inclined with respect to the central axis, wherein the first outwardly extending tooth is immediatel adjacent to the first gullet and the first inwardly extending tooth is immediately adjacent to the first outwardly extending tooth and non-adjacent to the first gullet;
a second cutting group including
a second inwardly extending tooth extending from a location directly above the circular wall to a location closer to the central axis than the inner face, the second inwardly extending tooth overlapping the centerline,
a second outwardly extending tooth extending from a location directly above the circular wall to a location farther from the central axis than the outer face, the second outwardly extending tooth overlapping the centerline, and
a second gullet extending downwardly along the circular wall from the rim toward the base and inclined with respect to the central axis, wherein the second outwardly extending tooth is immediately adjacent to the second gullet and the second inwardly extending tooth is immediately adjacent to the second outwardly extending tooth and non-adjacent to the second gullet; and
a first toothless expanse of the rim extending between the first cutting group and the second cutting group.

2. The rotary tool accessory of claim 1, further comprising:
a second toothless expanse of the rim extending from the second cutting group to the first cutting group.

3. The rotary tool accessory of claim 2, further comprising:
a third cutting group including
a third inwardly extending tooth extending from a location directly above the circular wall to a location closer to the central axis than the inner face, a third outwardly extending tooth extending from a location directly above the circular wall to a location farther from the central axis than the outer face, and a third gullet extending downwardly from the rim toward the base, wherein the third outwardly extending tooth is immediatel adjacent to the third gullet and the third inwardly extending tooth is immediately adjacent to the third outwardly extending tooth and non-adjacent to the third gullet, and a third toothless expanse of the rim extending between the first cutting group and the third cutting group.

4. The rotary tool accessory of claim 3, wherein each of the first cutting group, the second cutting group and the third cutting group is separated from the other of the first cutting group, the second cutting group and the third cutting group about the rim by about 120 degrees.

5. The rotary tool accessory of claim 3, wherein each of the second cutting group, and the third cutting group is separated from the first cutting group about the rim by about 90 degrees.

6. The rotary tool accessory of claim 1, wherein the first gullet comprises:
a ramped opening to the rim.

7. The rotary tool accessory of claim 1 wherein each of the gullets includes a first edge and a second edge defining an opening wherein the first edge extends to the rim, is adjacent to one of the outwardly extending teeth, and is inclined with respect to the central axis, and the second edge extends to the rim and is inclined with respect to the central axis at an angle different than the angle of the inclined first edge to form a ramped portion.

8. The rotary tool accessory of claim 7, wherein each of the teeth include a leading tip defined by an intersection of sides of the teeth, wherein each of the leading tips is aligned at the centerline.

9. The rotary tool accessory of claim 3 wherein each of the gullets includes a first edge and a second edge defining an opening wherein the first edge extends to the rim, is adjacent to one of the outwardly extending teeth, and is inclined with respect to the central axis, and the second edge extends to the rim and is inclined with respect to the central axis at an angle different than the angle of the inclined first edge to form a ramped portion.

10. The rotary tool accessory of claim 9, wherein each of the teeth include a leading tip defined by an intersection of sides of the teeth, wherein each of the leading tips is aligned at the centerline.

11. The rotary tool accessory of claim 10, wherein the first outwardly extending tooth and the first inwardly extending tooth are separated by a first distance determined along the circumference of the rim which is less than a second distance between the first edge and the second edge of the gullet determined along the circumference of the rim, the first and second distances being determined in a clockwise direction when viewed from a top plan view of an open end of the rotary tool accessory.

12. The rotary tool accessory of claim 2, wherein the first outwardly extending tooth and the first inwardly extending tooth are separated by a first distance determined along the circumference of the rim which is less than a second distance determined along the circumference of the rim between a first edge of the gullet and a second edge of the gullet each of which extends to the rim, the first and second distances being determined in a clockwise direction when viewed from a top plan view of an open end of the rotary tool accessory.

13. A rotary tool accessory comprising:
a base;
a circular wall extending upwardly from the base about a central axis, the circular wall including a circular rim extending between an inner face and an outer face, wherein the circular rim defines a centerline defining a circumference of the circular wall;
a first grouped cutting set and a second grouped cutting set, each of the first grouped cutting set and the second grouped cutting set including an inwardly extending tooth, an outwardly extending tooth, and an associated gullet including a first edge and a second edge defining an opening wherein the first edge extends toward the rim, is adjacent the outwardly extending tooth, and is inclined with respect to the central axis, and the second edge extends toward the rim, is non-adjacent to the outwardly extending tooth, and is inclined with respect to the central axis at an angle different than the angle of the inclined first edge to form a ramped portion, wherein each of the teeth includes a leading tip defined by an intersection of sides of the teeth, wherein each of the leading tips is aligned at the centerline; and
a first toothless expanse of the rim extending between the first cutting group and the second cutting group.

14. The rotary tool accessory of claim 13, further comprising:
a second toothless expanse of the rim extending from the first grouped cutting set to the second grouped cutting set.

15. The rotary tool accessory of claim 14, further comprising:
a third grouped cutting set including an inwardly extending tooth, an outwardly extending tooth, and an associated gullet; and
a second toothless expanse of the rim extending between the first grouped cutting set and the third grouped cutting set.

16. The rotary tool accessory of claim 15, wherein each of the first grouped cutting set, the second grouped cutting set and the third grouped cutting set is separated from the other of the first grouped cutting set, the second grouped cutting set and the third grouped cutting set about the rim by about 120 degrees.

17. The rotary tool accessory of claim 15, wherein each of the second grouped cutting set, and the third grouped cutting set is separated from the first grouped cutting set about the rim by about 90 degrees.

18. The rotary tool accessory of claim 13, wherein the outwardly extending tooth in the first grouped cutting set is located immediately adjacent to the inwardly extending tooth in the first grouped cutting set and immediately adjacent to the gullet in the first grouped cutting set.

19. The rotary tool accessory of claim 13, wherein:
the rotary tool accessory is rotatable about the central axis;
the outwardly extending tooth in the first grouped cutting set includes an uppermost portion that defines a first tooth width extending from a location directly above the circular wall to a location away from the central axis;
the inwardly extending tooth in the first grouped cutting set includes an uppermost portion that defines a second tooth width extending from a location directly above the circular wall to a location toward the central axis; and
an area swept by the first tooth width overlaps an area swept by the second tooth width as the rotary tool accessory is rotated about the central axis.

20. The rotary tool accessory of claim 13, wherein:
the rotary tool accessory is rotatable about the central axis;
the outwardly extending tooth in the first grouped cutting set includes an uppermost portion that defines a first maximum height above the circular rim;
the inwardly extending tooth in the first grouped cutting set includes an uppermost portion that defines a second maximum height above the circular rim; and
the first maximum height is higher than the second maximum height.

\* \* \* \* \*